(12) United States Patent
Engebretsen et al.

(10) Patent No.: US 9,203,699 B2
(45) Date of Patent: Dec. 1, 2015

(54) CONSTRUCTING AND VERIFYING SWITCH FABRIC CABLING SCHEMES

(71) Applicant: LENOVO ENTERPRISE SOLUTIONS (SINGAPORE) PTE. LTD., Singapore (SG)

(72) Inventors: David R. Engebretsen, Cannon Falls, MN (US); Benjamin R. Garbers, Onalaska, WI (US); David L. Hermsmeier, Oronoco, MN (US); Stephen A. Knight, Rochester, MN (US); Jaimeson Saley, Rochester, MN (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 108 days.

(21) Appl. No.: 14/178,068

(22) Filed: Feb. 11, 2014

(65) Prior Publication Data
US 2015/0229524 A1    Aug. 13, 2015

(51) Int. Cl.
*H04L 12/28* (2006.01)
*H04L 12/24* (2006.01)
*H04L 12/721* (2013.01)

(52) U.S. Cl.
CPC ........ *H04L 41/0853* (2013.01); *H04L 41/0893* (2013.01); *H04L 45/44* (2013.01)

(58) Field of Classification Search
CPC ....................................................... H04L 49/70
See application file for complete search history.

(56) References Cited

U.S. PATENT DOCUMENTS

| | | | |
|---|---|---|---|
| 6,381,643 | B1 | 4/2002 | Bartfai et al. |
| 7,619,981 | B2 | 11/2009 | Bomhoff et al. |
| 2010/0054260 | A1* | 3/2010 | Pandey et al. ............ 370/395.53 |
| 2010/0214949 | A1* | 8/2010 | Smith et al. .................... 370/254 |
| 2011/0299822 | A1 | 12/2011 | Barry et al. |
| 2013/0044631 | A1* | 2/2013 | Biswas et al. ................. 370/254 |
| 2013/0086405 | A1 | 4/2013 | Chou et al. |
| 2013/0298126 | A1* | 11/2013 | Nakagawa ........................ 718/1 |

* cited by examiner

*Primary Examiner* — Kouroush Mohebbi
(74) *Attorney, Agent, or Firm* — Patterson + Sheridan, LLP (57) ABSTRACT

A distributed network switch includes multiple switch modules connected by one or more physical cables. One switch module may determine which connector port of a remote switch module is connected by physical cable based on information received from the remote switch module, including link identifiers, and further based on a physical topology predetermined about the type of remote switch module.

13 Claims, 4 Drawing Sheets

CONSTRUCTING AND VERIFYING SWITCH FABRIC CABLING SCHEMES

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the present disclosure provide a method, product, and system for performing an operation for verifying cabling of a distributed network switch. The method includes detecting that a physical connection has been made from a first switch module to a second switch module. The physical connection includes a plurality of links including a first link, wherein the first link connects a first sub-switch element of a first plurality of sub-switch elements within the first switch module to a second sub-switch element of a second plurality of sub-switch elements within the second switch module. The method further includes determining a link identifier associated with the first link based on a first port identifier of the first sub-switch element and on a second port identifier of the second sub-switch element. The method includes retrieving, from a memory of the second switch module, information associated the second switch module and the second sub-switch element. The method includes retrieving a physical topology associated with the second switch module from a catalog of switch modules based on the retrieved information, and determining, by execution of a processing element in the first switch module, a connector port of the second switch module associated with the physical connection based on the physical topology and on the link identifier.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the following, reference is made to embodiments of the present disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
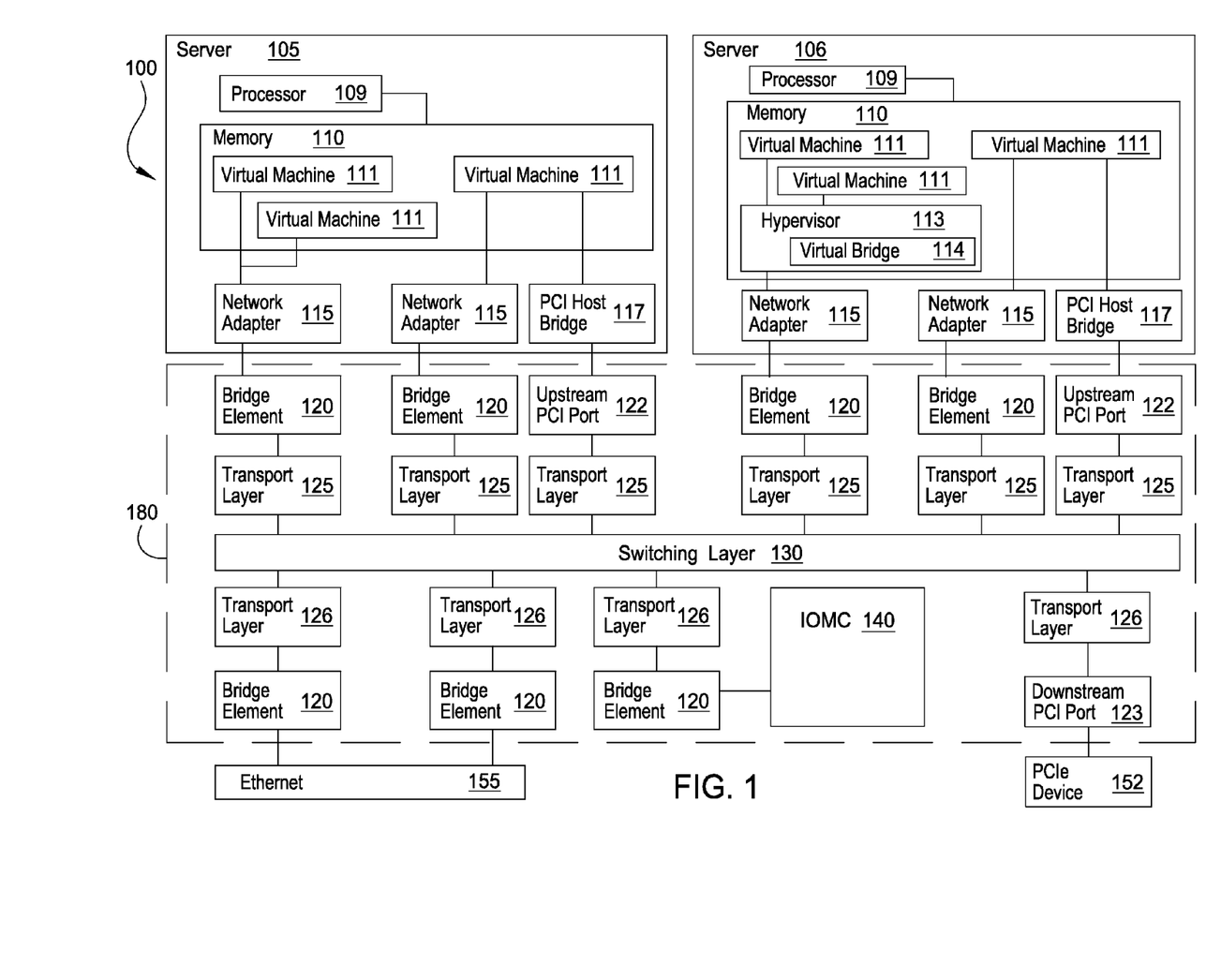
FIG. 1 illustrates a system architecture that includes a distributed network switch, according to one embodiment of the present disclosure.

Referring now to FIG. 1, FIG. 1 illustrates a system architecture 100 that includes a distributed network switch 180, according to one embodiment of the present disclosure. The computer system 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

Figure 2:
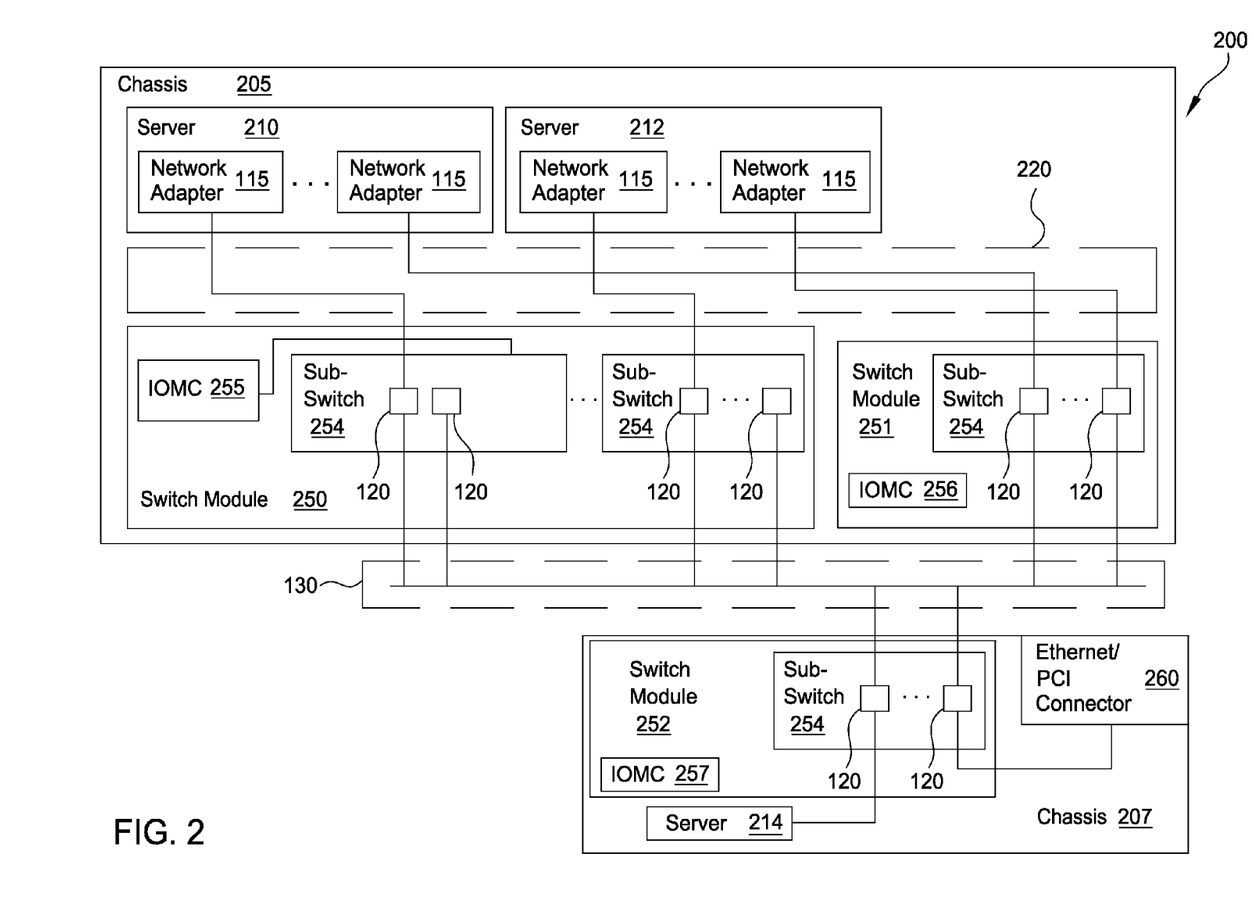
FIG. 2 illustrates a hardware representation of a system that implements a distributed network switch, according to one embodiment of the present disclosure.

FIG. 2 illustrates a hardware representation of a system 200 that implements a distributed network switch 180, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252, sometimes referred to as a chassis interconnect elements or CIE, are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be a distributed Virtual Ethernet bridge (dVEB) configured to forward data frames throughout the distributed network switch 180. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 152. The device 152 may be additional storage or memory which each server 210, 212, 214 may access via the switching layer 130. Advantageously, the system 200 provides access to a switching layer 130 that has network devices that are compatible with at least two different communication methods.

As shown, each server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

The bridge elements 120 are operatively connected to multiple bridge elements 120. In one embodiment, the bridge elements 120 are connected to each other using the switching layer 130 (e.g., via a mesh connection schema). As such, no matter the bridge element 120 used, a data packet can be routed to another bridge element 120 located on any other switch module. In some embodiments, this may be accomplished by directly connecting each bridge element 120, i.e., each bridge element 120 having a dedicated direct data path to every other bridge element 120. Alternatively, in some embodiments, the switching layer 130 may use a spine-leaf architecture wherein each bridge element 120 (i.e., a leaf node) is attached to at least one spine node. The spine nodes route data packets received from the bridge elements 120 to the correct spine node, which then forward the data packet to the correct bridge element 120. In one embodiment, the bridge elements 120 may forward data frames to other bridge elements 120 in the same sub-switch 254, in different sub-switches 254 of the same switch module (e.g., switch module 250), or even in different switch modules 250, 251, 252 via switching layer 130.

Verifying Switch Fabric Cabling

In many cases, a data center may include multiple racks of servers (e.g., servers 210, 212) and I/O devices that are interconnected with switch hardware, such as the switch modules 250, 251, 252 of the distributed network switch 180. To expand the capability, as well as the performance, of the distributed network switch 180, multiple switch modules can be attached to each other via physical cabling and other physical connections. The physical cabling that interconnects these switch modules can involve hundreds of cabling possibilities. The physical configuration of the distributed network switch 180, sometimes referred to as the switch fabric, and the sequence of how the distributed network switch is constructed can have an impact on the performance and resiliency of the overall interconnected system. For instance, redundant paths within the distributed network switch can allow for dynamic failover capabilities (so that disruption of user services can be reduced when single points of failure occur) and increase the overall bandwidth between the devices connected to the distributed network switch. However, in some cases, concurrent maintenance of the distributed network switch is allowed and, if not performed correctly, can cause a failure or expose the system to failure, for example, by inadvertently partitioning the switch. Therefore, the ability to interactively detect and describe the physical connectivity characteristics of the distributed network switch 180 may be desirable and enables the ability to produce interactive cabling assistance utilities for facilitating complex switch configurations.

Accordingly, embodiments of the present disclosure provides switch module configured to detect when a switch fabric cable is physically connected to the switch module, and fetch detailed information about what is attached on the other end of the switch fabric cable (e.g., another switch module) before normal user traffic is allowed to flow through the cable. Based on the fetched information, the switch module (e.g., via execution of firmware) can be configured to decode the physical characteristics of adjacent switch modules and may then pass this information to higher-level functions for a multitude of purposes. For example, the switch module may provide the information to cable assistance utility software that generates step-by-step instructions on how to cable a desired configuration of the distributed network switch with immediate verification of cable connections. In another example, the information from the switch module may be used to warn users of bad cabling actions during concurrent maintenance actions of the distributed network switch. In yet another example, the information from the switch module may be used to generate suggestions as to exact steps (e.g., cabling steps) that should be taken to enhance overall performance of the system. As such, embodiments of the present disclosure include both the hardware features and firmware constructs configured to make such information available via the cable, and enable the production of higher-level utility software for constructing and maintaining the distributed network switch.

Figure 3:
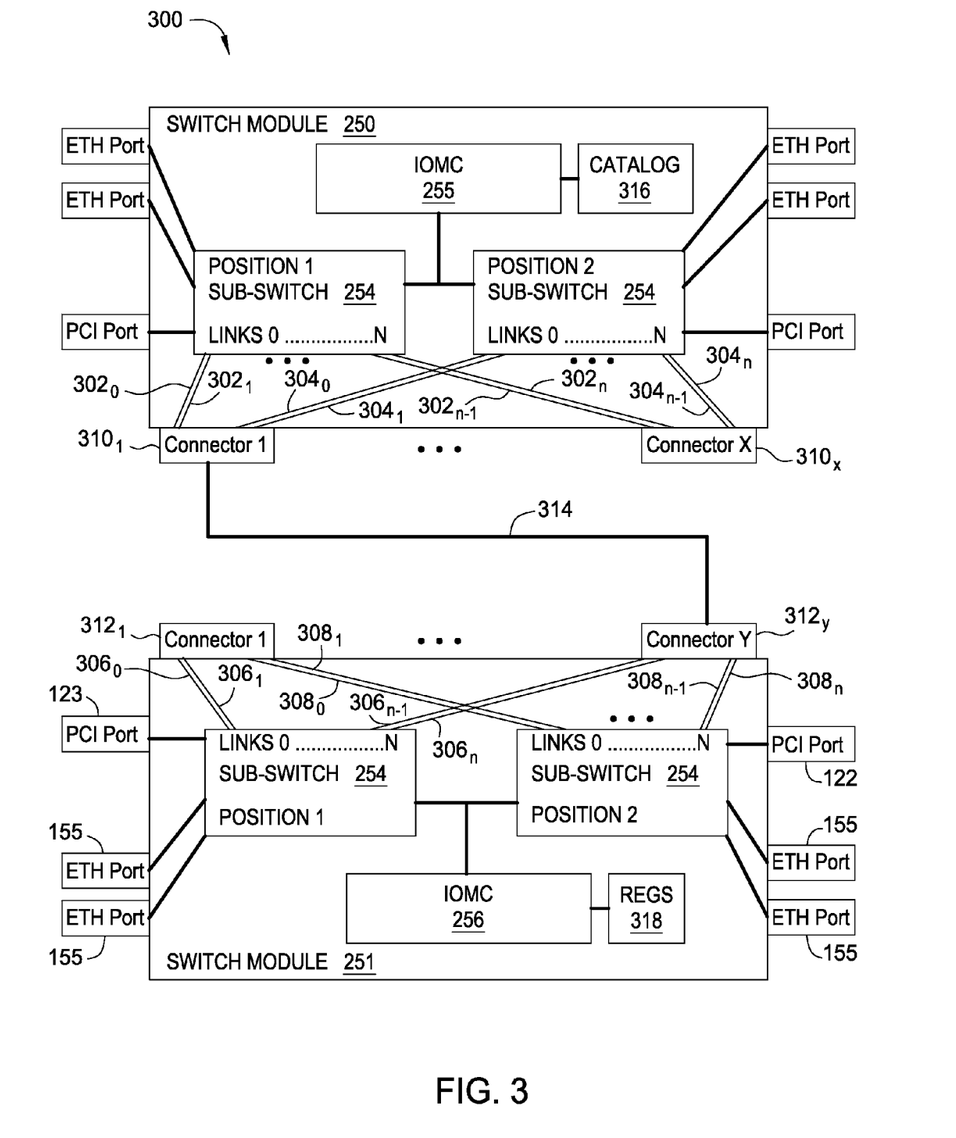
FIG. 3 illustrates a hardware level diagram of the distributed network switch, according to one embodiment of the present disclosure.

FIG. 3 illustrates a hardware level diagram of the distributed network switch 180, according to one embodiment of the present disclosure. Each switch module 250, 251 includes a processing element (e.g., IOMC 255) that may be coupled to one or more sub-switches 254, also referred to as sub-switch elements or switch elements, within the switch module. In some embodiments, the IOMC 255 may include a direct connection to the sub-switches within the switch module to allow the IOMC (e.g., via firmware) to manage the function of the sub-switches.

In one or more embodiments, the distributed network switch 180 comprises a plurality of physical cabling, referred to herein as chassis links 314 or "c-links", that interconnect one or more switch modules, and a plurality of individual physical links, referred to herein as "i-links," that form connections and routes through the distributed network switch. Each sub-switch 254 in a switch module may be connected to a plurality of i-links. In the embodiment shown in FIG. 3, the first sub-switch 254 is connected to a plurality of i-links 302 which are identified by corresponding port identifiers 0 to N (e.g., $302_0$ to $302_N$). Similarly, the second sub-switch is connected to a second plurality of i-links $304_0$ to $304_N$, the third sub-switch of the switch module 251 is connected a third plurality of i-links $306_0$ to $306_N$, and the fourth sub-switch is connected to a plurality of i-links $308_0$ to $308_N$. The switch modules may be interconnected by c-links 314, which may comprise a bundle of multiple i-links. In one implementation, a c-link 314 may comprise a bundle of sixteen i-links.

In one embodiment, each switch module includes a plurality of connector ports 310, 312 configured to be removably coupled to one or more c-links 314. In the embodiment shown, the first switch module 250 having a first plurality of connector ports $310_1$ to $310_X$ and the second switch module 251 having a second plurality of connector ports $312_1$ to $312_Y$ are connected together by a c-link 314 connecting the connector port $310_1$ of the first switch module 250 to the connector port $312_Y$ of the second switch module 251. Each sub-switch 254 of a switch module may be connected to one or more connector ports via the plurality of i-links within the switch module. Each connector port 310, 312 may be coupled to (e.g., physically wired to) one or more i-links connected to the sub-switches, thereby providing connectivity to sub-switches 254 within each switch module. In some embodiments, a sub-switch 254 in a switch module may be connected to every connector port of that switch module by one or more i-links. In some embodiments, each i-link that comes out of a sub-switch 254 is uniquely wired to a connector, such that, given information identifying the i-link and the sub-switch, the connector wired to those elements may be inferred. For example, in the embodiment shown in FIG. 3, the first sub-switch 254 of the switch module 250 is connected to the first connector port $310_1$ by i-links $302_0$ and $302_1$ and a second connector port $310_X$ by i-links $302_{N-1}$ and $302_N$. As shown, the first sub-switch 254 within the switch module 250 is communicatively coupled to the second sub-switch 254 within the switch module 251 via i-links $302_0$, $302_1$ connector port $310_1$, c-link 314, connector port $312_Y$, and i-links $308_{N-1}$, $308_N$.

In the embodiment shown, switch modules 250, 251 include a first sub-switch 254 designated at a first position (identified as "Position 1") and a second sub-switch 254 designated at a second position (identified as "Position 2"). In one or more embodiments, each switch module may have a different physical characteristic, which refers to the physical configuration of a certain number of sub-switches (e.g., 4 sub-switches per switch module) arranged in a particular configuration (e.g., linear or array configuration) in particular designated positions within the switch module. The various physical characteristics of switch modules may be predetermined (e.g., obtained from internal sources or third-party device manufacturers) and stored in a catalog 316 of device profiles for use in the techniques described herein. Device profiles within catalog 316 specify pre-determined knowledge of which i-link port identifiers associated with certain sub-switches are wired to connectors ports within a particular switch module.

For example, a device profile for the switch module 251 may specify that this particular model of switch module includes a sub-switch in a position identified as "Position 1", which is connected to a connector port having an identifier "Connector 1" (e.g., $312_1$) by i-links having port identifiers "0" and "1" (e.g., $306_0$, $306_1$), and is also connected to a connector port having an identifier "Connector Y" (e.g., $312_Y$) by i-links having port identifiers "N−1" and "N" (e.g., $306_{N-1}$, $306_N$). The device profile of the switch module 251 further specifies that the switch module include a sub-switch in Position 2, which is connected to the connector port having the identifier "Connector 1" by i-links having port identifiers "0" and "1" (e.g., $308_0$, $308_1$), and is also connected to the connector port having an identifier "Connector Y" by i-links having port identifiers "N−1" and "N" (e.g., $308_{N-1}$, $308_N$).

In one embodiment, device profiles within catalog 316 are associated with a particular model of a switch module, which may be identified by an identifier associated with the switch module, including a model number, a version number, a serial number, and serial number format. In some embodiments, the catalog 316 may be stored in a memory (not shown) accessible to IOMC 255, or in other embodiments, may be embodied as part of executable program logic (e.g., data structure within firmware) executable by the IOMC 255. It should be recognized that the device profiles within catalog 316 are not limited to switch modules and may include other networking components configured to be coupled as part of (e.g., routers, switches) or coupled to (e.g., servers) the distributed network switch 180.

Figure 4:
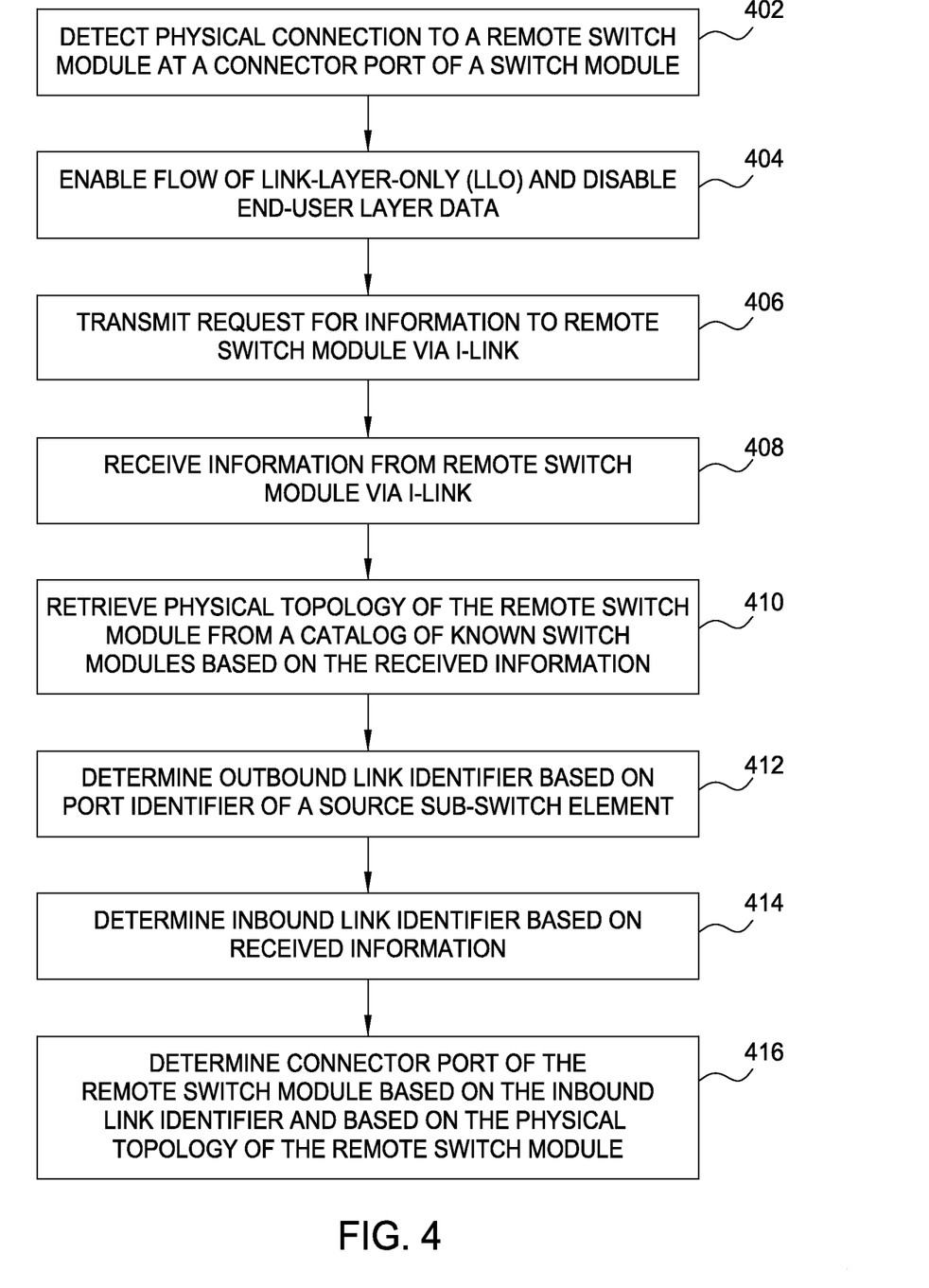
FIG. 4 is a flow diagram depicting a method for verifying cabling of a distributed network switch, according to one embodiment of the present disclosure.

FIG. 4 is a flow diagram depicting a method 400 for verifying cabling of a distributed network switch, according to one embodiment of the present disclosure. As shown, the method 400 begins at block 402, where a first switch module 250 (e.g., by operation of the IOMC 255) detects that a physical connection has been made to a second "remote" switch module at a connector port of the switch module 250. As used herein, a "remote" switch module refers to the switch module on the other end of the physical connection with a "source" switch module, i.e., "remote" from the perspective of the source switch module. In one embodiment, the physical connection comprises a coupling of a c-link 314 coupled between the switch modules, at respective connector ports on the switch modules. As a c-link may contain a plurality of i-links, the physical connection forms one or more i-link connections between sub-switches within each switch module. For simplicity of explanation, the method 400 is described in relation to a single i-link connection (e.g., $302_0$ and $308_{N-1}$) between a first sub-switch 254 on the switch module 250 and a second sub-switch 254 on the switch module 251, but it should be recognized that the method may be applied to additional i-link connections made as a result of the physical connection.

At block 404, the switch module 250 enables flow of link-layer-only (LLO) data and disables flow of end-user layer data over the physical connection. In some embodiments, end-user data may only be enabled to flow through the distributed network switch via firmware action to the sub-switches 254 through a controlling IOMC 255. The IOMC 255 may modify the i-link to disable flow of the end-user layer data and enter a LLO state. When an i-link is in an LLO state, certain information may be made available to the firmware about the i-link, including state information (e.g., LLO traffic, active link, link disconnect, etc.), the remote switch module type, and i-link identifier information. The i-links may remain in a Link Level Only state until discovery and appropriate initialization has been performed. In one embodiment, packets referred to as Directed Route Load Store (DRLS) may be transmitted across predetermined i-links to move information between the switch modules, sub-switches, and IOMCs at the time an i-link first becomes connected to another switch module. As described below, the DRLS may be manipulated via a PCIe interface to each sub-switch element 254.

At block 406, the switch module 250 transmits a request for information to the switch module through an i-link (e.g., $302_0$) contained in the c-link 314. In some embodiments, responsive to detecting that a physical connection has been made, the switch module 250 may perform a link initialization process that establishes the link between a sub-switch 254 in the switch module 250 and a sub-switch 254 in the remote switch module 250. In addition to configuration and negotiation of settings (e.g., link speed, etc.), the link initialization may include an exchange of identifiers associated with each sub-switch. As such, the switch module 250 may receive from the remote switch module an i-link port identifier (e.g., port "N") of the remote sub-switch 254, and a position identifier (e.g., Position "2") of a sub-switch 254 within the switch module that is connected to the i-link.

In one embodiment, the distributed network switch 180 may use a packet-based delivery mechanism to direct the actions of individual switch modules within the distributed network switch 180. A controller may transmit a management packet to a particular switch module within the distributed network switch 180, which contains a set of load/store operations which, when executed, are configured to configure the links of the switch module (e.g., in block 406).

According to one or more embodiments, the distributed network switch 180 may also use the packet-based delivery mechanism to get data from one component to another, such as switch module information from a switch module to a requesting IOMC 255, although other mechanisms for sharing information between switch modules may be used. In one embodiment, one switch module 250 may be configured to manipulate and/or read registers within another switch module using a management packet sent between the switch modules.

In some embodiments, the payload of the management packet, which is sometimes referred to as a Directed Route Load/Store (DRLS) packet, includes a list of commands (e.g., read or write operations on particular registers) and/or other payload data. In some embodiments, the payload of the management packet includes a set of defined Load/Store, And/Or and Semaphore operations which are to be executed by the remote switch module. In one implementation, the management packet may be 256 bytes in payload length.

In one embodiment, the management packet uses directed routing to traverse across un-initialized switch modules, i.e., switch modules that do not yet have a link initialized and established between the switch modules. For example, a controller (e.g., IOMC 255 of the switch module 250) could retrieve path information specifying a route from the controller through the distributed network switch to the remote switch module 251. The controller could then create a packet that includes at least a portion of the path information. For example, the packet could include a list of link identifiers corresponding to a set of predetermined i-links that are used to transmit the packet from the controller to the remote sub-switch 254. As an example, the created packet could contain the port identifiers "5, 2, 3", indicating that the controller will transmit the packet to a first sub-switch 254 using the controller's i-link with link identifier "5", the first sub-switch will transmit the packet to a second sub-switch using the first switch module's i-link with link identifer "2", and the second switch module will transmit the packet to the remote sub-switch 254 within the remote switch module 254 using the second sub-switch module's i-link with link identifier "3". In one embodiment, the created packet may not contain a link identifier associated with the path between the controller and the first sub-switch 254. For example, the controller could be configured to insert the packet into a buffer within the first sub-switch 254 using PCIe communications, the buffer associated with a directed route load store (DRLS) component, described later.

The created packet is then transmitted to another switch module within the distributed switch. Here, the packet could be transmitted using a link on the controller unit that is determined based on the retrieved path information. For example, the path information could specify that the packet should be transmitted using the controller's link having link ID "5". The packet may go through any number of intermediary switch modules (not shown) before ultimately reaching the remote switch module.

In one implementation, each switch module may include a DRLS component having a respective execution buffer. The execution buffer refers to some area of memory on a switch module (or accessible by the switch module) that is configured to store one or more load/store operations for execution. For example, the execution buffer could be an array object on the switch module and logic on the switch module could be configured to monitor the array to determine when load/store operations are copied into the array for execution. In one embodiment, the DRLS component may be configured to detect when operations are written to their respective execution buffer (e.g., via PCIe communications), and, upon detecting the execution buffer contains load/store operations, execute the contents of the respective execution buffer (e.g., in an order based on the order the load/store operations are stored in the array). In some embodiments, the DRLS component executes commands found in the execution buffer, including read and/or write commands on the registers (e.g., registers 318). The DRLS component may be further configured to generate a management packet containing path information to a destination switch module and a set of load/store operations for execution on the destination switch module. The DRLS component may be configured to generate an acknowledgement message, as described later. As such, the switch module may use the DRLS mechanism to perform link initialization and retrieve information associated with the remote switch module.

In one embodiment, the IOMC 255 generates and transmits a management packet requesting a read ("load") operation that returns information associated with the i-link. The remote switch module, upon receiving the packet, copies the set of load/store operations within the packet into the execution buffer on the remote switch module. The remote control module of the remote switch module 251 processes the management packet by executing (e.g., by operation of the IOMC 256) each of the commands contained within the packet. The management packet may have a payload containing a list of read commands that cause the remote switch module 251 to retrieve data from one or more registers 318 containing data that describes the remote switch module 251. The registers 318 may comprise a set of pre-determined register locations initialized by the remote switch module (e.g., at startup) to contain the information describing that switch module. The information describing a switch module may include a switch module type or model identifier, a version number, a serial number, a fabric identifier associated with the switch module (e.g., fabric World Wide Name), and other metadata associated with the switch module.

Once the load/store operations within the packet have been executed, the remote switch module 251 transmits an acknowledgement message back to the switch module 250 from which the management packet was received. In one embodiment, the payload of the acknowledgement message contains the requested information, e.g., link identifiers of the remote switch module. In embodiments, where the packet itself is transmitted back to the switch module 250 as the acknowledgement message, the remote switch module 251 overlays the requested information into the packet itself and transmits the resultant the packet back to the switch module 250.

At block 408, the switch module 250 receives information from the remote switch module 251 through the i-link contained in the c-link 314. In some embodiments, the switch module 250 (e.g., by operation of the IOMC 255) receives and processes the acknowledgement packet to retrieve information associated with the i-link and with the remote switch module from payload portions of the packet.

At block 410, the switch module 250 retrieves a physical topology of the remote switch module 251 from the catalog 316 of known switch modules based on the received information. In some embodiments, the switch module 250 performs a lookup in the catalog 316 to retrieve a physical topology that specifies how the remote switch module is wired to its connector ports. For example, the physical topology associated with the remote switch module specifies the second port identifier for the second sub-switch element is wired to the connector port (e.g., connector 312$_y$).

At block 412, the switch module 250 determines an outbound link identifier based on the link identifier of a source switch element (e.g., sub-switch 254). In one embodiment, from the perspective of a sub-switch 254, each i-link has a unique link identifier associated with the i-link for outbound traffic and a different (possibly non-unique) link identifier associated with the i-link for inbound traffic. In one embodiment, the outbound link identifier is determined based on the source sub-switch 254, and may be set to the i-link port identifier of the source sub-switch 254 (e.g., i-link port "0").

At block 414, the switch module 250 determines an inbound link identifier based on the received information. In some embodiments, the inbound link identifier is set to the i-link port identifier of the remote sub-switch given by the remote sub-switch 254. In other words, the inbound link identifier for a sub-switch 254 is the outbound link identifier of the connected remote sub-switch 254.

It should be recognized that, because multiple remote sub-switches may be connected to the same source sub-switch, the inbound identifier may not be unique. For example, as shown in FIG. 3, the i-link $302_0$ of the first sub-switch 254 within the first switch module 250 may have an outbound link identifier of "0." I-link $302_0$ is physically wired to connector port $310_1$ which connects to connector port $312_Y$ on the switch module 251 by the c-link 314 (which contains i-links within the c-link). As shown, the i-link coming out of the connector port $312_Y$ on the switch module 251 represents the same i-link, and is connected to the i-link $308_N$ of the sub-switch 254 at Position 2. As such, in this example, the outbound link identifier associated with i-link $302_0$ of the first sub-switch 254 within the first switch module 250 is "0" and the inbound link identifier associated with the i-link $302_0$ is "N," when the c-link 314 is coupled as shown.

If the c-link 314 was disconnected from the connector port $312_Y$ on the second switch module 251 and was re-attached to a different connector port 312 of the second switch module 251, the outbound link identifier associated with i-link $302_0$ would remain unchanged, but the inbound link identifier associated with the i-link $302_0$ may change, depending on the physical configuration of the remote switch module 251. At a minimum, the inbound link identifier associated with the i-link $302_0$ would no longer be "N" from the second sub-switch at Position 2. If the inbound link identifier does happen to have the value "N," it may be inferred that the link identifier is associated with another sub-switch within the switch module 251. For example, if the c-link 314 was disconnected from the connector port $312_Y$ and connected to the first connector port $312_1$ of the second switch module 251, the outbound link identifier associated with i-link $302_0$ would still be "0," and the inbound link identifier associated with the i-link $302_0$ changes to the port identifier "0" associated with the i-link $308_0$ coupling the connector $312_1$ to the sub-switch at position 2.

According to one or more embodiments, the switch module 250 (e.g., by execution of firmware on IOMC 255) may decode the connector numbers of the remote switch module to which the switch module 250 is connected based on knowledge obtained from the catalog 316 that specifies the particular physical characteristics of the model of the remote switch module, such as knowledge of how the different i-link identifiers for different sub-switches are wired to connectors ports within the particular switch module.

Referring back to FIG. 4, at block 416, the switch module 250 determines the connector port of the remote switch module based on at least the inbound link identifier, and further based on the physical topology of the remote switch module 251. In some embodiments, the switch module 250 determines the remote c-link connector port based on the inbound link identifier, the remote sub-switch 254 position, and the model/version of the remote switch module 251. In one embodiment, the switch module 250 determines a connector port identifier based on a comparison between the link identifiers and the known physical topology, where an inbound portion of the link identifier matches a port identifier connected to that connector port on the remote switch module, as specified by the physical topology. For example, in the embodiment shown in FIG. 3, the switch module 250 concludes that the c-link 314 is connected to connector port "Y" (e.g., $312_Y$) because the established i-link to the remote sub-switch designated at Position 2 has an inbound link identifier of "N", and the only connector wired to that i-link port N of the remote sub-switch is connector "Y", as known based on the physical topology of the remote switch module. In some embodiments, the switch module 250 may enable flow of end-user data through the c-link and resume normal operation of the switch modules for forwarding traffic through the distributed network switch 180.

Accordingly, embodiments described herein provide a mechanism for verifying cabling between switch modules in a distributed network switch. Embodiments of the present disclosure enable physical cabling to be verified when a switch module is inserted into or removed from the distributed network switch, all while the distributed network switch may be in operation. Embodiments of the present disclosure uses information transported between adjacent switch units before a fabric switch unit cable is allowed to transport normal user data and knowledge of how the switch fabric connectors are constructed (i.e., wired). From the information gathered, the switch unit firmware can decode the physical characteristics of adjacent switch units and can then pass this information to higher level functions for a multitude of purposes. For example, one embodiment, based on the determined connector port, the switch module 250 may pass the determined connector port to higher-level software, such as a cabling utility, which is configured to generate a graphical view depicting the switch module connected by a cable to the remote switch module at the determined connector port. In another embodiment, the determined connector port may be used to verify that the switch modules have been cabled, for example, in a redundant manner. In other embodiments, the switch module 250 may provide the determined connector port to a cabling utility, which may be configured to responsively generate instructions to physical cable the switch modules.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer program product for verifying cabling of a distributed network switch, the computer program product comprising:
    a non-transitory computer-readable storage medium having computer-readable program code embodied therewith, the computer-readable program code comprising:
    computer-readable program code, executable by a processor, configured to detect that a physical connection has been made from a first switch module to a second switch module, wherein the physical connection comprises a plurality of links including a first link, wherein the first link connects a first sub-switch element of a first plurality of sub-switch elements within the first switch module to a second sub-switch element of a second plurality of sub-switch elements within the second switch module;
    computer-readable program code configured to determine a link identifier associated with the first link based on a first port identifier of the first sub-switch element and on a second port identifier of the second sub-switch element;
    computer-readable program code configured to retrieve, from a memory of the second switch module, information associated the second switch module;
    computer-readable program code configured to retrieve a physical topology associated with the second switch module from a catalog of switch modules based on the retrieved information; and
    computer-readable program code configured to determine, by execution of a processing element in the first switch module, a connector port of the second switch module associated with the physical connection based on the physical topology and on the link identifier.

2. The computer program product of claim 1, wherein the link identifier associated with the first link comprises an outbound link identifier set to the first port identifier and an inbound link identifier set to the second port identifier.

3. The computer program product of claim 1, wherein the retrieved information associated with the second switch module comprises a model number identifying a type of the second switch module.

4. The computer program product of claim 1, wherein the computer-readable program code configured to determine the connector port of the second switch module associated with the physical connection based on the physical topology and on the link identifier further comprises:
    computer-readable program code configured to determine an inbound portion of the link identifier matches a port identifier specified by the physical topology.

5. The computer program product of claim 1, wherein the physical topology associated with the second switch module specifies the second port identifier for the second sub-switch element is wired to the connector port.

6. The computer program product of claim 1, wherein the computer-readable program code configured to retrieve information associated the second switch module further comprises:
    computer-readable program code configured to transmit a management packet to the second switch module, wherein the management packet comprises a read instruction from a register in the memory of the second switch module.

7. The computer program product of claim 1, further comprising
    computer-readable program code configured to, responsive to detecting that the physical connection has been made from the first switch module to the second switch module, enable flow of link-layer data over the first link and disable flow of end user layer data over the first link.

8. A switch module comprising:
    a first connector port coupled to a first plurality of sub-switch elements;
    a computer processor;
    a memory comprising a catalog of switch modules and storing management firmware, which, when executed on the computer processor, performs an operation comprising:
    detecting that a physical connection has been made from the switch module to a remote switch module at the first connector port, wherein the physical connection comprises a plurality of links including a first link, wherein the first link connects a first sub-switch element of the first plurality of sub-switch elements to a second sub-switch element of a second plurality of sub-switch elements within the remote switch module;
    determining a link identifier associated with the first link based on a first port identifier of the first sub-switch element and on a second port identifier of the second sub-switch element;
    retrieving, from a memory of the remote switch module, information associated the remote switch module;
    retrieving a physical topology associated with the remote switch module from the catalog of switch modules based on the retrieved information; and
    determining, by execution of the computer processor, a second connector port of the remote switch module associated with the physical connection based on the physical topology and on the link identifier.

9. The switch module of claim 8, wherein the link identifier associated with the first link comprises an outbound link identifier set to the first port identifier and an inbound link identifier set to the second port identifier.

10. The switch module of claim 8, wherein the retrieved information associated with the second switch module comprises a model number identifying a type of the remote switch module.

11. The switch module of claim 8, wherein determining the connector port of the remote switch module associated with the physical connection based on the physical topology and on the link identifier further comprises:
    determining an inbound portion of the link identifier matches a port identifier specified by the physical topology.

12. The switch module of claim 8, wherein the physical topology associated with the remote switch module specifies the second port identifier for the second sub-switch element is wired to the connector port.

13. The switch module of claim 8, wherein the operation further comprises:
    responsive to that detecting the physical connection has been made from the switch module to the remote switch module, enabling flow of link-layer data over the first link and disabling flow of end user layer data over the first link.

* * * * *